United States Patent
Sprague et al.

(10) Patent No.: US 7,830,592 B1
(45) Date of Patent: Nov. 9, 2010

(54) DISPLAY DEVICES HAVING MICRO-REFLECTORS

(75) Inventors: Robert A. Sprague, Saratoga, CA (US); Yi-Shung Chaug, Cupertino, CA (US); HongMei Zang, Sunnyvale, CA (US); Xiaojia Wang, Fremont, CA (US); Gary Kang, Fremont, CA (US)

(73) Assignee: SiPix Imaging, Inc., Fremont, CA (US)

( * ) Notice: Subject to any disclaimer, the term of this patent is extended or adjusted under 35 U.S.C. 154(b) by 72 days.

(21) Appl. No.: 12/323,300

(22) Filed: Nov. 25, 2008

Related U.S. Application Data

(60) Provisional application No. 60/991,600, filed on Nov. 30, 2007, provisional application No. 61/030,140, filed on Feb. 20, 2008.

(51) Int. Cl.
*G02B 26/00* (2006.01)
*G02F 1/03* (2006.01)
*G02F 1/29* (2006.01)

(52) U.S. Cl. .............. 359/296; 359/245; 359/315; 359/316; 345/33; 345/107; 349/139; 205/82; 205/182; 257/88; 257/100

(58) Field of Classification Search .............. 359/245, 359/296; 205/82, 96, 115, 123, 148, 170, 205/182–185; 264/1.6, 1.8, 2.6, 2.7; 165/104.21, 165/104.26, 104.33; 345/87, 105, 107, 33, 345/106, 204; 438/479; 349/65, 38, 113, 349/114, 139; 313/504; 445/24; 362/606, 362/613, 614, 607, 619, 620, 627
See application file for complete search history.

(56) References Cited

U.S. PATENT DOCUMENTS

| | | | | |
|---|---|---|---|---|
| 6,144,430 A * | 11/2000 | Kuo | .............. | 349/113 |
| 6,277,263 B1 * | 8/2001 | Chen | .............. | 205/182 |
| 6,327,013 B1 * | 12/2001 | Tombling et al. | .............. | 349/139 |
| 6,556,261 B1 * | 4/2003 | Krusius et al. | .............. | 349/73 |
| 6,565,729 B2 * | 5/2003 | Chen et al. | .............. | 205/82 |
| 6,806,995 B2 * | 10/2004 | Chung et al. | .............. | 359/296 |
| 6,930,818 B1 | 8/2005 | Liang et al. | | |
| 7,046,228 B2 | 5/2006 | Liang et al. | | |
| 7,294,866 B2 * | 11/2007 | Liu | .............. | 257/100 |
| 7,332,066 B2 * | 2/2008 | Chen et al. | .............. | 205/96 |
| 7,339,716 B2 * | 3/2008 | Ding et al. | .............. | 359/296 |
| 7,342,556 B2 * | 3/2008 | Oue et al. | .............. | 345/33 |
| 7,638,808 B2 * | 12/2009 | Owen et al. | .............. | 257/88 |

FOREIGN PATENT DOCUMENTS

WO  WO 2008/122927  10/2008

* cited by examiner

*Primary Examiner*—Loha Ben
(74) *Attorney, Agent, or Firm*—Howrey LLP

(57) ABSTRACT

The present invention relates to a process for manufacturing a brightness enhancement structure comprising micro-reflectors. The process comprises forming an array of micro-structures by embossing; and depositing a metal layer over the surface of the micro-structures. The present invention also relates to a process for manufacturing a display device comprising micro-reflectors. The present invention further relates to a display device comprising micro-reflectors.

21 Claims, 18 Drawing Sheets

Viewing Side

Viewing Side

Figure 3ℓ

DISPLAY DEVICES HAVING MICRO-REFLECTORS

This application claims priority to U.S. Provisional Application Nos. 60/991,600, filed Nov. 30, 2007; and 61/030,140, filed Feb. 20, 2008; which are incorporated herein by reference in their entirety.

FIELD OF THE INVENTION

The present application describes a brightness enhancement structure comprising micro-reflectors and display devices having such a brightness enhancement structure on its viewing side. The present invention is directed to manufacturing processes for the brightness enhancement structure and display devices having the brightness enhancement structure.

SUMMARY OF THE INVENTION

The brightness of a display panel, particularly an electrophoretic display panel, may be enhanced through the use of a brightness enhancement structure comprising micro-reflectors fabricated on top of the viewing surface of the display panel. This may be accomplished by building a structure on top of the display cells to deflect the light striking the top viewing surface. Such a structure can serve two purposes. First, it can divert the illumination light from reaching the wall of the display cells onto the reflective surface of the display panel, thus saving this light which would have otherwise been transmitted by, or absorbed into, display cell walls (i.e., an inactive part of the display panel). Secondly, without the structure on top of the display cells, light scattered by the display panel in reflection which strikes the surface of the transparent material on top of the display panel at an angle greater than the critical angle is reflected back onto the display panel and most of it is lost to the viewer. The micro-reflector structure intercepts these rays and redirects them more towards the viewer because they strike the top surface at an angle less than the critical angle and are thus transmitted through the surface, achieving a second source of brightness enhancement. It is believed that such brightness enhancement techniques can potentially achieve a brightness enhancement of as much as two times of the original brightness.

The first aspect of the application describes a brightness enhancement structure comprising micro-reflectors. The micro-reflectors have a reflective surface for reflecting scattered light to enhance brightness.

The second aspect of the application is directed to processes for the manufacture of a brightness enhancement structure comprising micro-reflectors.

In one embodiment of the second aspect of the application, micro-structures may be formed by embossing, followed by depositing a reflective metal layer on the surface of the micro-structures. To ensure that the metal material is deposited over the intended surface, a strippable masking layer may be applied over the surface between the micro-structures, but not over the surface of the micro-structures. The strippable masking layer, along with the metal deposited thereon is removed afterwards, by solvent or mechanical means. The deposition of the metal layer on the intended surface may also be accomplished by the use of a film coated with an adhesive layer.

In another embodiment of the second aspect of the application, the micro-reflectors may be formed by using a metal mesh. The metal mesh may be formed by stamping, electroforming or other metal structure fabrication processes.

The third aspect of the application is directed to processes for the manufacture of a display device having a brightness enhancement structure comprising micro-reflectors on its viewing side.

In one embodiment of the third aspect of the application, the process is a self-aligned process. The self-aligned process comprises adding a transparent conductive layer (such as an ITO, IZO, polymer impregnated with carbon nano-tubes, conductive organic polymer or PEDOT [poly(3,4-ethylenedioxythiophene)]) or a transparent partially conductive layer over the interface surface of the micro-reflectors and forming display cells on the transparent conductive or partially conductive layer by a photolithography process, utilizing the micro-reflector structure as a photomask. For formation of the display cells by the photolithography process, a positively working photoresist may be used and in such a case, after exposure to radiation, the unexposed areas are hardened to form the partition walls of the display cells while the exposed areas are removed to reveal the display cells. The display cells formed may then be filled with a display fluid and sealed.

In another embodiment of the third aspect of the application, the display cells are formed over the transparent conductive or partially conductive layer by microembossing.

The fourth aspect of the application is directed to a display device which comprises color filters and a brightness enhancement structure comprising micro-reflectors on the viewing surface of the display device.

The fifth aspect of the application is directed to a color display device which comprises a dual switching mode and a brightness enhancement structure comprising micro-reflectors on the viewing surface of the display device.

BRIEF DISCUSSION OF THE DRAWINGS

FIGS. 3l and 3m depict an alternative process for depositing a metal layer.

FIG. 8a depicts a three-dimensional view of the micro-structures formed in FIG. 3a.

DETAILED DESCRIPTION OF THE INVENTION

A "display device," as used herein, refers to a device that displays images. The display devices in this application include all types of reflective display devices such as electrophoretic display devices and liquid crystal display devices. Electrophoretic display devices are preferred for this invention.

"Micro-structures" as used herein, refer to cavities. "Micro-reflectors" as used herein, refer to micro-structures having a metal layer coated on its surface. Micro-structures or Micro-reflectors are illustrated in FIGS. 2b (303), 3a-3c (303), 3k-3m (303), FIG. 4 (403), FIG. 7 (703), and FIG. 8a (803). The dimensions of the micro-reflectors are illustrated in the present application. The cavities (i.e., micro-reflectors) in general may have a width and height between 1-1000 microns, preferably 10-500 microns, and more preferably 20-300 microns.

Figure 1A:
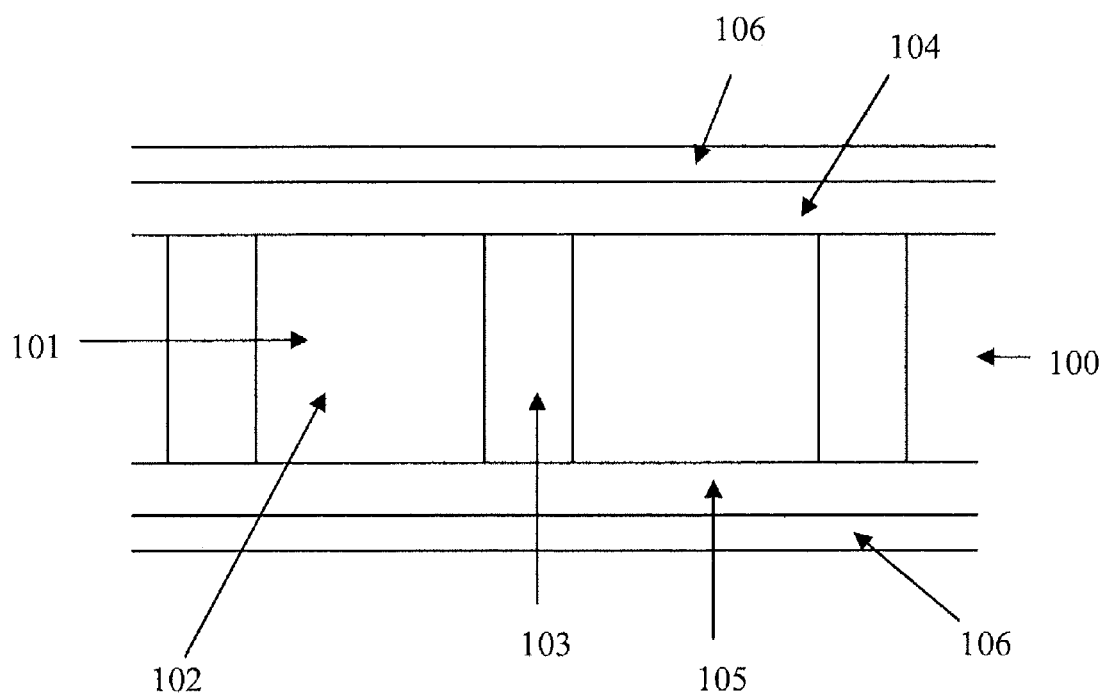
FIGS. 1a and 1b depict display devices.

FIG. 1a illustrates a display device (100). The device comprises an array of display cells (101) filled with a display fluid (102). Each of the display cells is surrounded by partition walls (103). The array of display cells is sandwiched between two electrode layers (104 and 105).

For an electrophoretic display panel, the display cells are filled with an electrophoretic fluid which comprises charged particles dispersed in a solvent. The display fluid may be a system comprising one or two types of particles. In the system comprising only one type of particles, the charged particles are dispersed in a solvent of a contrasting color. The charged particles will be drawn to one of the electrode layers (104 or 105), depending on the potential difference of the two electrode layers, thus causing the display panel to show either the color of the particles or the color of the solvent, on the viewing side.

In a system comprising particles carrying opposite charges and of two contrasting colors, the particles would move to one electrode layer or the other, based on the charge that they carry and the potential difference of the two electrode layers, causing the display panel to show the two contrasting colors, on the viewing side. In this case, the particles may be dispersed in a clear solvent.

The display cells may also be filled with a liquid crystal composition. In addition, it is understood that the present invention is applicable to all types of reflective display devices.

For a segment display device, the two electrode layers (104 and 105) are one common electrode (e.g., ITO) and one patterned segment electrode layer, respectively. For an active matrix display device, the two electrode layers (104 and 105) are one common electrode and an array of thin film transistor pixel electrodes, respectively. For a passive matrix display device, the two electrode layers (104 and 105) are two line-patterned electrode layers. The electrode layers are usually formed on a substrate layer (106) (such as polyethylene terephthalate, PET). The substrate layer may also be a glass layer.

Figure 1B:
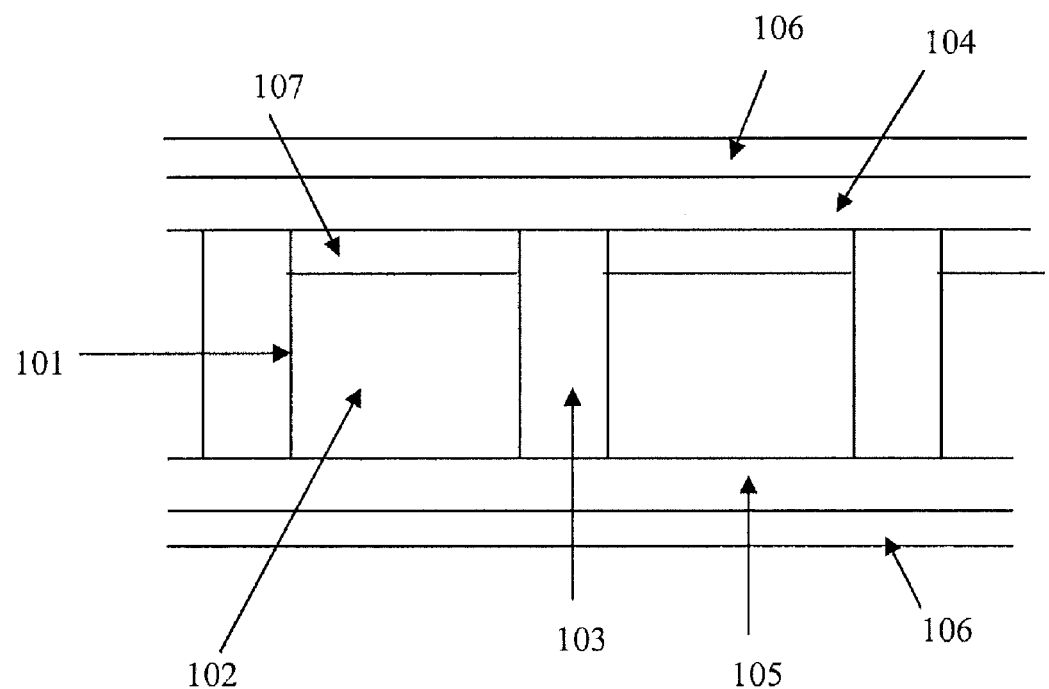

For a microcup-based display device as shown in FIG. 1b and disclosed in U.S. Pat. No. 6,930,818, the content of which is incorporated herein by reference in its entirety, the filled display cells are sealed with a polymeric sealing layer (107). Such a display device may be viewed from the sealing layer side or the side opposite the sealing layer side, depending on the transparency of the materials used and the application.

Figure 2A:
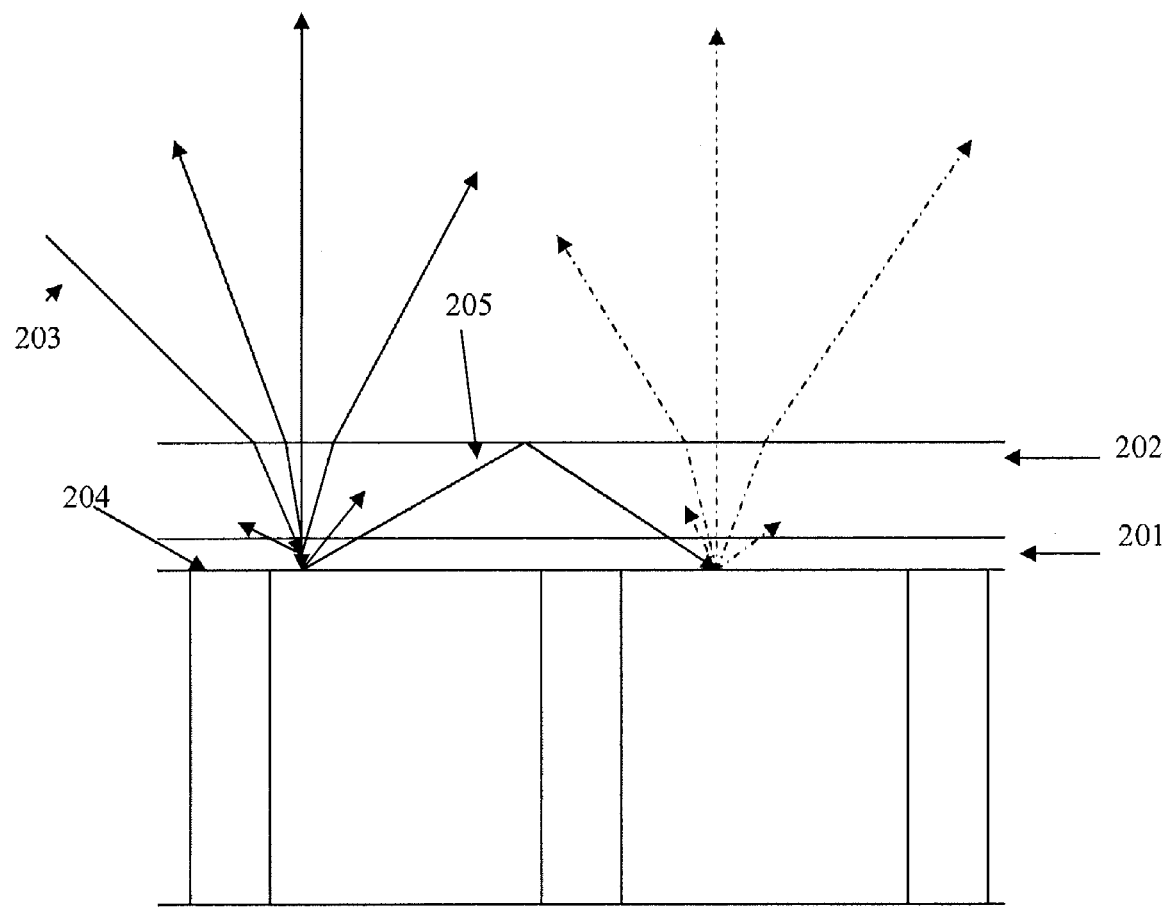
FIG. 2a illustrates the phenomenon of total internal reflection.
Figure 2B:
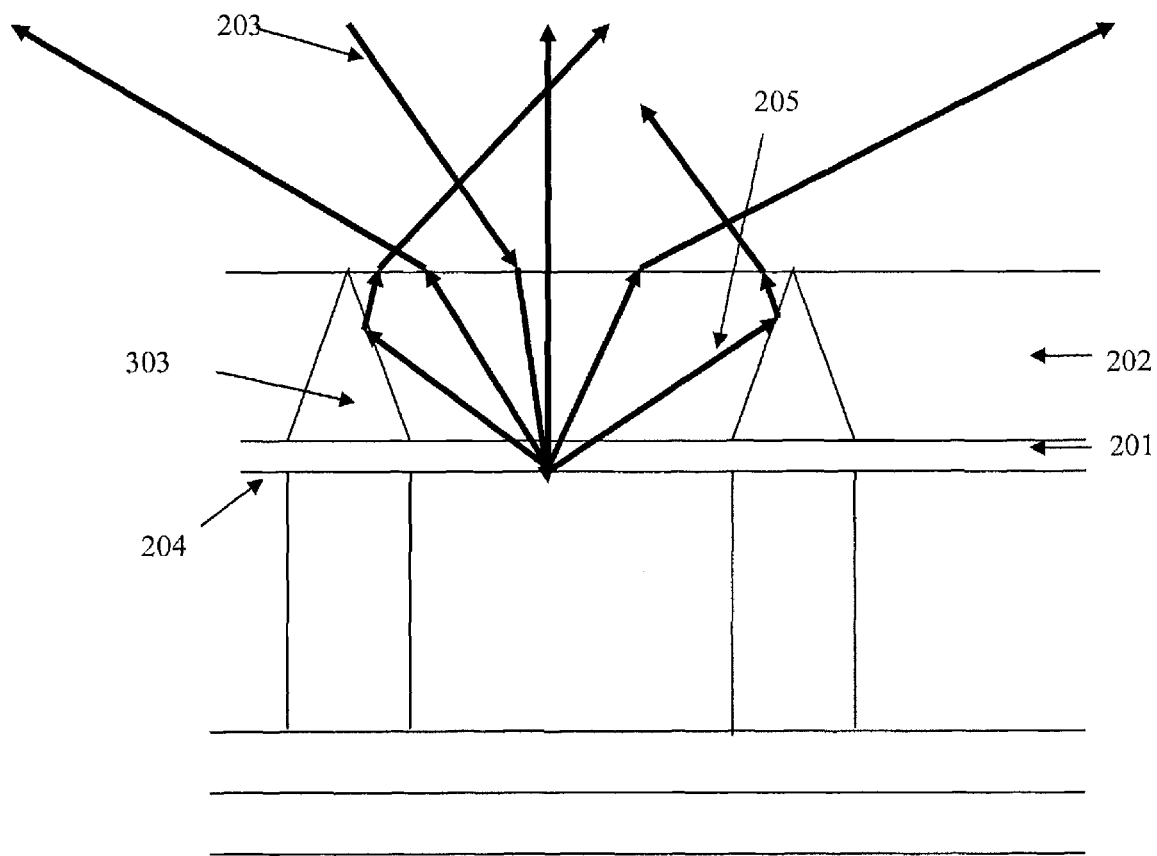
FIG. 2b illustrates how micro-reflectors on top of a display cell structure can deflect the scattered light.

FIG. 2a illustrates the phenomenon of total internal reflection. In this figure, the ITO electrode layer (201) and the substrate layer (202) (e.g., PET) are transparent. When incoming light (203) reaches the surface (204) of the display cells, most of the light scatters as shown. However, some of scattering light (205) reflects back to the surface (204) of the display cells because of the presence of the substrate layer (202) which has a higher refractive index (usually about 1.5) than the air (which has a refractive index of about 1) surrounding the display panel. This total internal reflection phenomenon can result in a loss of about 30-50% of the scattering light, thus causing reduction of the brightness of the display panel.

The loss of the scattering light may be partially or completely eliminated if micro-reflectors are fabricated on the top surface of the display device, on the viewing side. The micro-reflectors deflect the light to allow the light to strike the top surface of the substrate layer (202) at an angle less than the critical angle and is thus transmitted through the layer. The critical angle of incidence for total internal reflection, as defined by the angle of incidence which provides an angle of refraction of 90°, is well known to those skilled in the art as $\sin^{-1}(n2/n1)$, where n2 is the index of refraction of air and n1 is the index of refraction of layer 202.

FIG. 2b illustrates how micro-reflectors (303) on top of a display cell structure can deflect the scattered light (205).

Formation of Micro-Reflectors

FIGS. 3a-3e illustrate a process for the manufacture of a brightness enhancement structure comprising micro-reflectors.

Figure 3A:
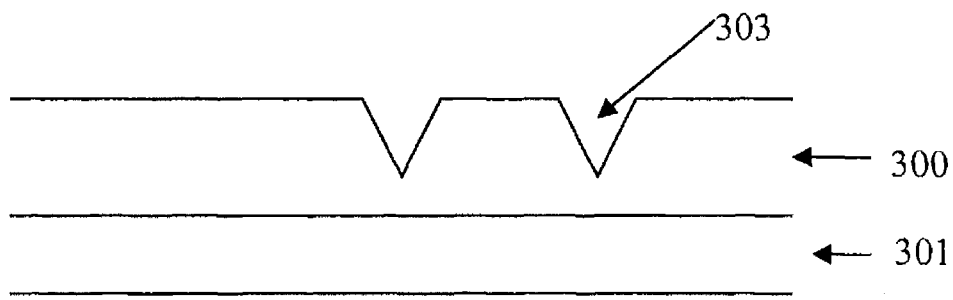
FIGS. 3a-3e illustrate a process of the present invention for manufacturing a brightness enhancement structure comprising micro-reflectors.

In FIG. 3a, an array of micro-structures is formed. The micro-structures may be formed on a base film by embossing. In the embossing process, an embossable composition (300) on a substrate (301) is embossed by a male mold at a temperature higher than the glass transition temperature of the embossable composition. Such a male mold may be in the form of a roller, plate or belt. The embossable composition may comprise a thermoplastic, thermoset or a precursor thereof. More specifically, the embossable composition may comprise multifunctional acrylate or methacrylate, multifunctional vinylether, multifunctional epoxide or an oligomer or polymer thereof. The glass transition temperatures (or Tg) for this class of materials usually range from about −70° C. to about 150° C., preferably from about −20° C. to about 50° C. The embossing process is typically carried out at a temperature higher than the Tg. A heated male mold or a heated housing substrate against which the mold presses may be used to control the embossing temperature and pressure. The male mold is usually formed of a metal such as nickel.

As shown in FIG. 3a, the mold creates the micro-structures (303) and is released during or after the embossable composition is hardened. The hardening of the embossable composition may be accomplished by cooling, solvent evaporation, cross-linking by radiation, heat or moisture.

In the context of the present invention, the cavity 303 is referred to as a micro-structure and the micro-structure, after being coated a metal layer on its surface, is referred to as a micro-reflector.

The hardened embossable composition (300) is preferably substantially transparent.

Figure 8A:
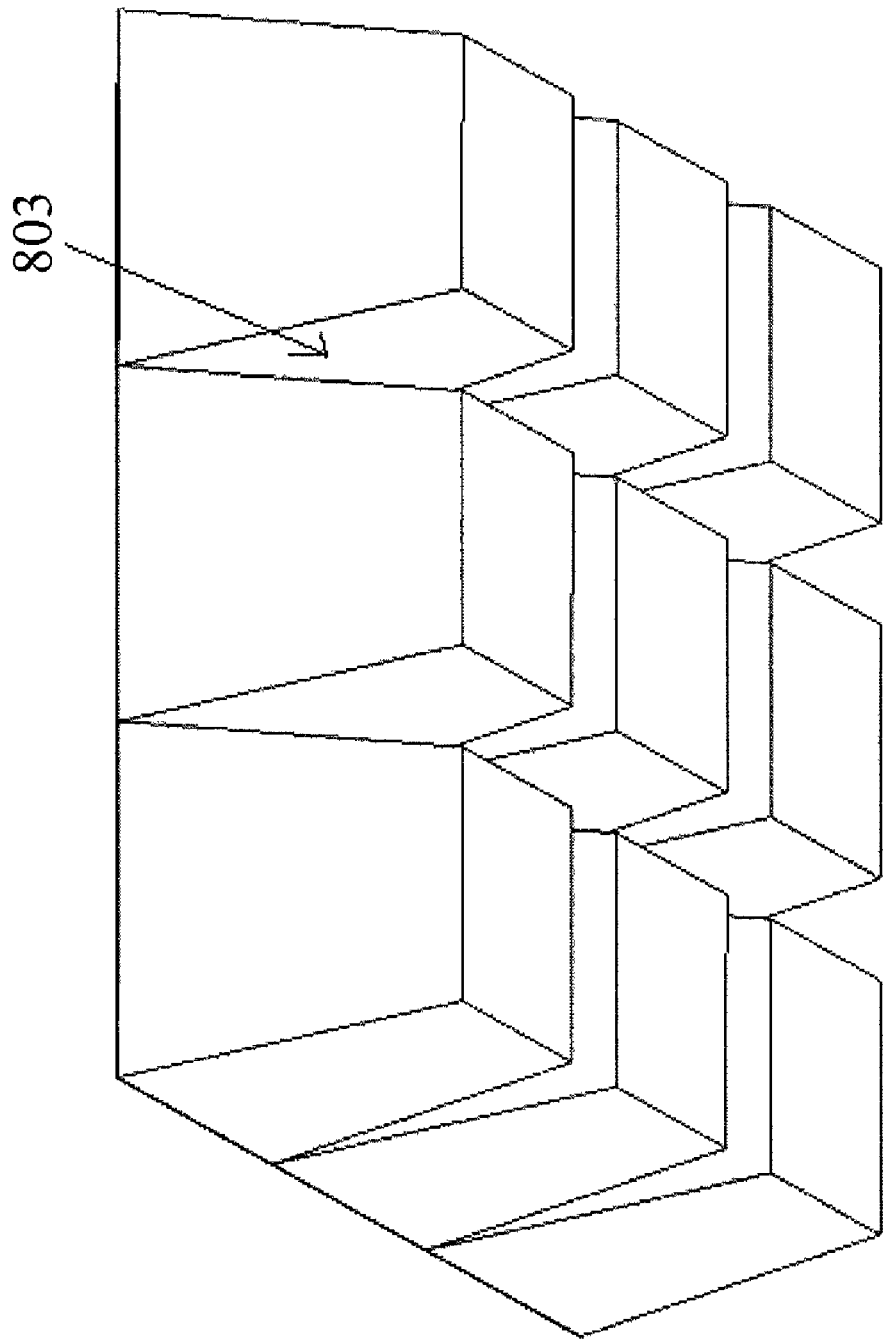

FIG. 8a is a three-dimensional view of the micro-structures (803) formed in FIG. 3a.

Figure 3B:
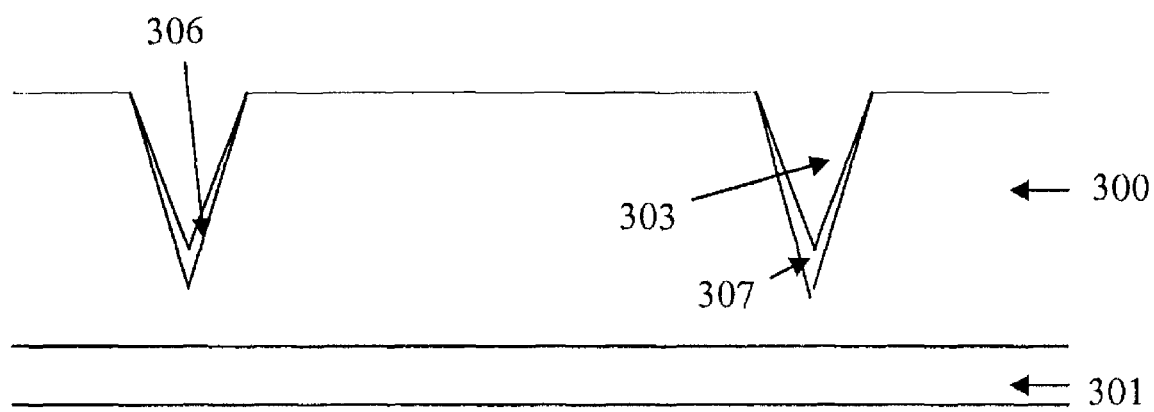

A metal layer (307) is then deposited over the surface (306) of the micro-structures (303) as shown in FIG. 3b. Suitable metals for this step may include, but are not limited to, aluminum, copper, zinc, tin, molybdenum, nickel, chromium, silver, gold, iron, indium, thallium, titanium, tantalum, tungsten, rhodium, palladium, platinum and cobalt. Aluminum is usually preferred. The metal material must be reflective, and it may be deposited on the surface (306) of the micro-structures, using a variety of techniques such as sputtering, evaporation, roll transfer coating, electroless plating or the like.

Figure 3C:
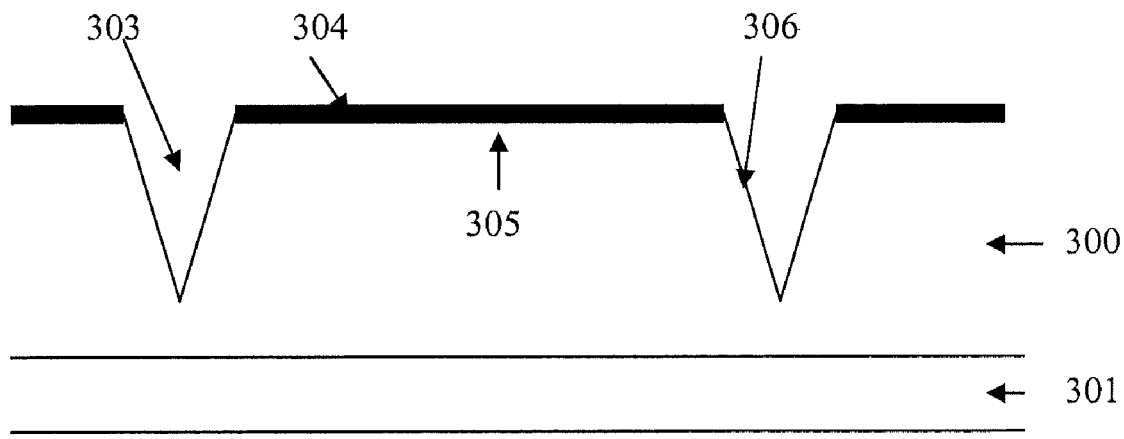

In order to facilitate formation of the metal layer only on the intended surface (i.e., the surface 306 of the micro-structures), a strippable masking layer may be coated before metal deposition, over the surface on which the metal layer is not to be deposited. As shown in FIG. 3c, a strippable masking layer (304) is coated onto the surface (305) between the openings of the micro-structures. The strippable masking layer is not coated on the surface (306) of the micro-structures.

The coating of the strippable masking layer may be accomplished by a printing technique, such as flexographic printing, driographic printing, electrophotographic printing, lithographic printing, gravure printing, thermal printing, inkjet printing or screen printing. The coating may also be accomplished by a transfer-coating technique involving the use of a release layer. The strippable masking layer preferably has a thickness in the range of about 0.01 to about 20 microns, more preferably about 1 to about 10 microns.

For ease of stripping, the layer is preferably formed from a water-soluble or water-dispersible material. Organic materials may also be used. For example, the strippable masking layer may be formed from a re-dispersible particulate material. The advantage of the re-dispersible particulate material is that the coated layer may be easily removed without using a solubility enhancer. The term "re-dispersible particulate" is derived from the observation that the presence of particles in the material in a significant quantity will not decrease the stripping ability of a dried coating and, on the contrary, their presence actually enhances the stripping speed of the coated layer.

The re-dispersible particulate consists of particles that are surface treated to be hydrophilic through anionic, cationic or non-ionic functionalities. Their sizes are in microns, preferably in the range of about 0.1 to about 15 um and more preferably in the range of about 0.3 to about 8 um. Particles in these size ranges have been found to create proper surface roughness on a coated layer having a thickness of <15 um. The re-dispersible particulate may have a surface area in the range of about 50 to about 500 $m^2/g$, preferably in the range of about 200 to about 400 $m^2/g$. The interior of the re-dispersible particulate may also be modified to have a pore volume in the range of about 0.3 to about 3.0 ml/g, preferably in the range of about 0.7 to about 2.0 ml/g.

Commercially available re-dispersible particulates for the present invention may include, but are not limited to, micronized silica particles, such as those of the Sylojet series or Syloid series from Grace Davison, Columbia, Md., USA.

Non-porous nano sized water re-dispersible colloid silica particles, such as LUDOX AM can also be used together with the micron sized particles to enhance both the surface hardness and stripping rate of the coated layer.

Other organic and inorganic particles, with sufficient hydrophilicity through surface treatment, may also be suitable. The surface modification can be achieved by inorganic and organic surface modification. The surface treatment provides the dispensability of the particles in water and the re-wetability in the coated layer.

Figure 3D:
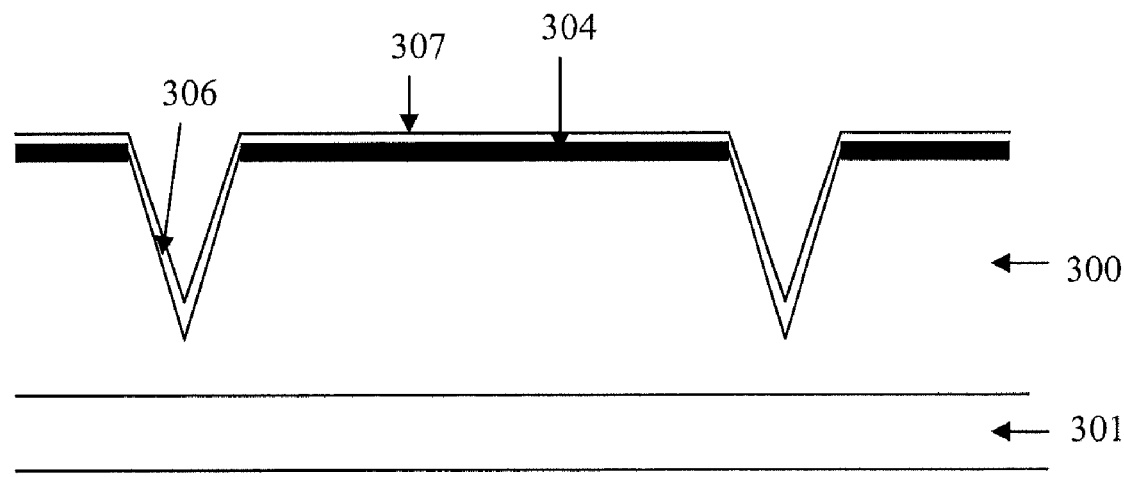

In FIG. 3d, a metal layer (307) is shown to be deposited over the entire surface, including the surface (306) of the micro-structures and the surface (305) between the openings of the micro-structures. Suitable metal materials are those as described above. The metal material must be reflective and may be deposited by a variety of techniques previously described.

Figure 3E:
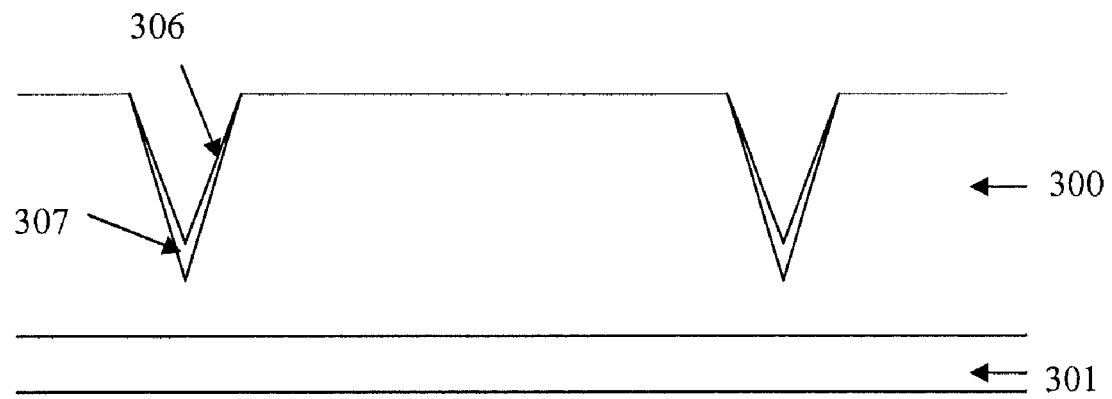

FIG. 3e shows the structure after removal of the strippable masking layer (304) with the metal layer 307 coated thereon.

This step may be carried out with an aqueous or non-aqueous solvent such as water, MEK, acetone, ethanol or isopropanol or the like, depending on the material used for the strippable masking layer. The strippable masking layer may also be removed by mechanical means, such as brushing, using a spray nozzle or peeling it off with an adhesive layer. While removing the strippable masking layer (304), the metal layer (307) deposited on the strippable masking layer is also removed, leaving the metal layer (307) only on the surface (306) of the micro-structures, as shown.

Figure 3F:
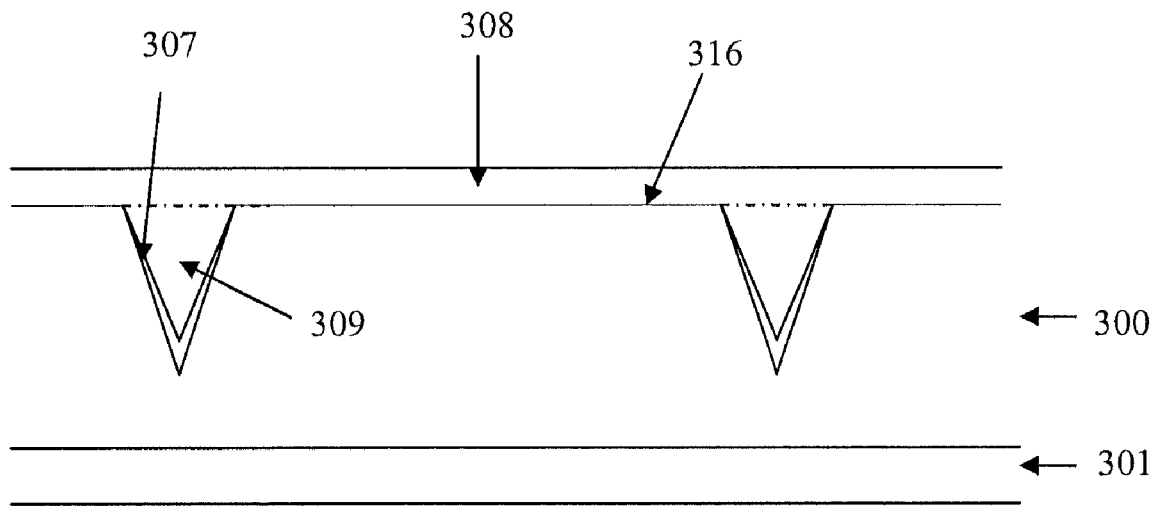
FIGS. 3f-3j illustrate a process for manufacturing a display device having the micro-reflectors self aligned with a display cell structure.
Figure 3G:
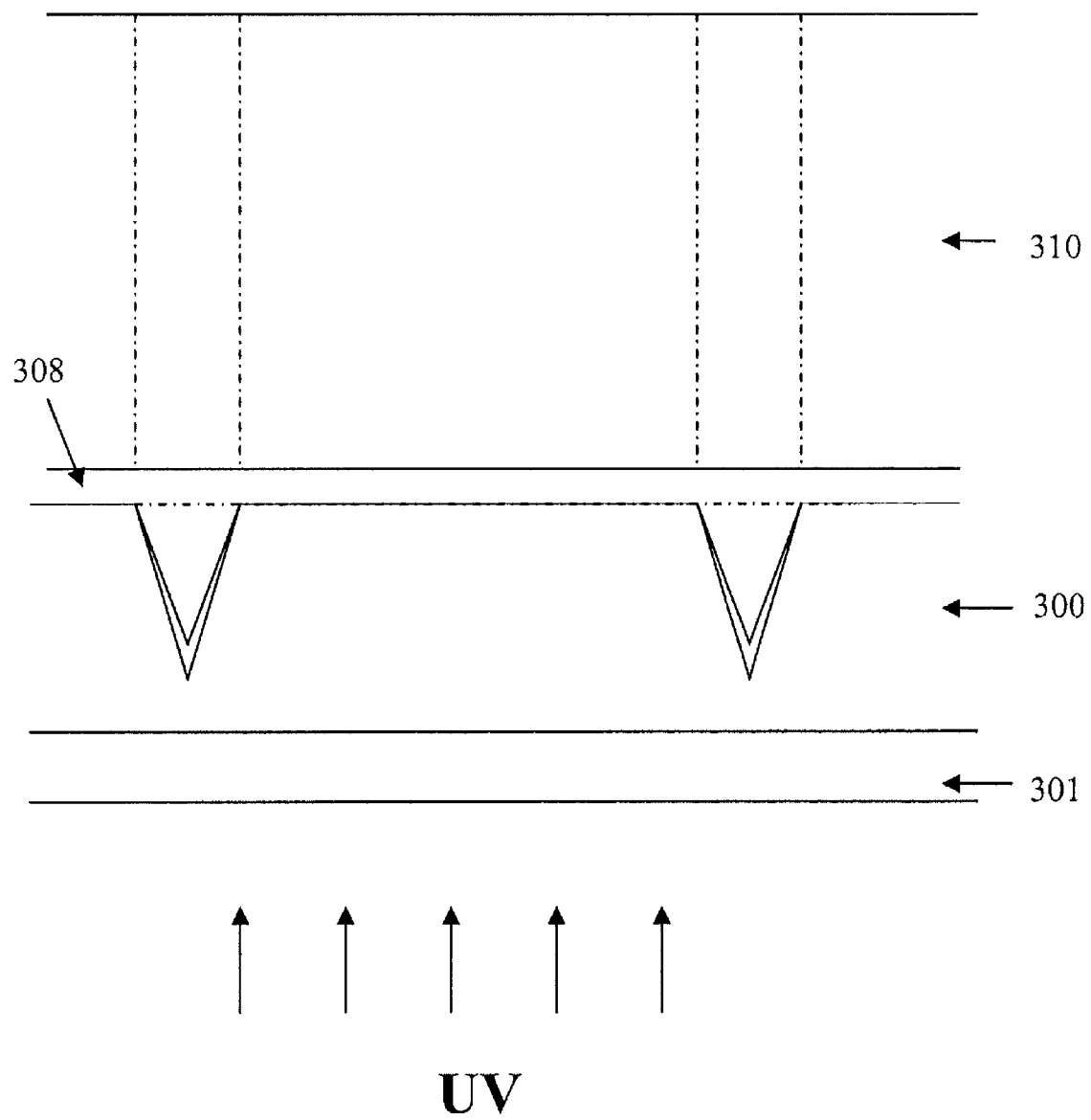
Figure 3H:
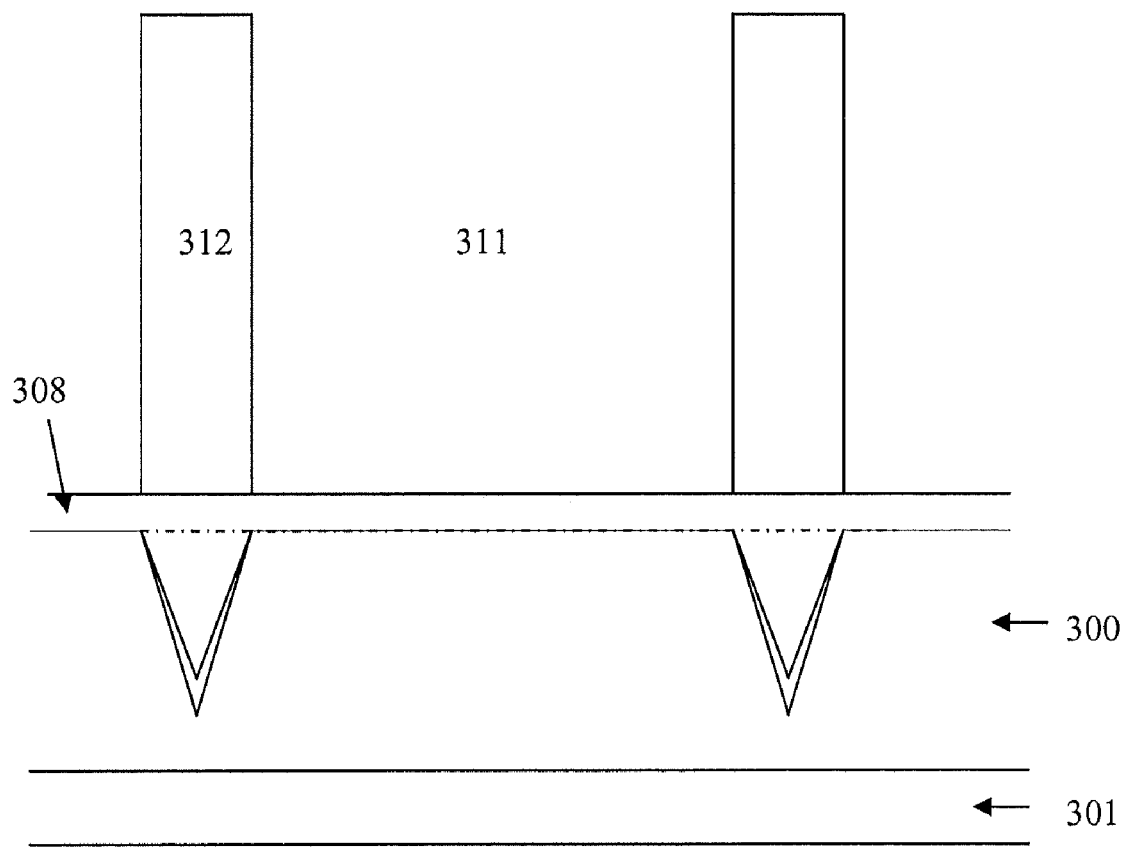
Figure 3I:
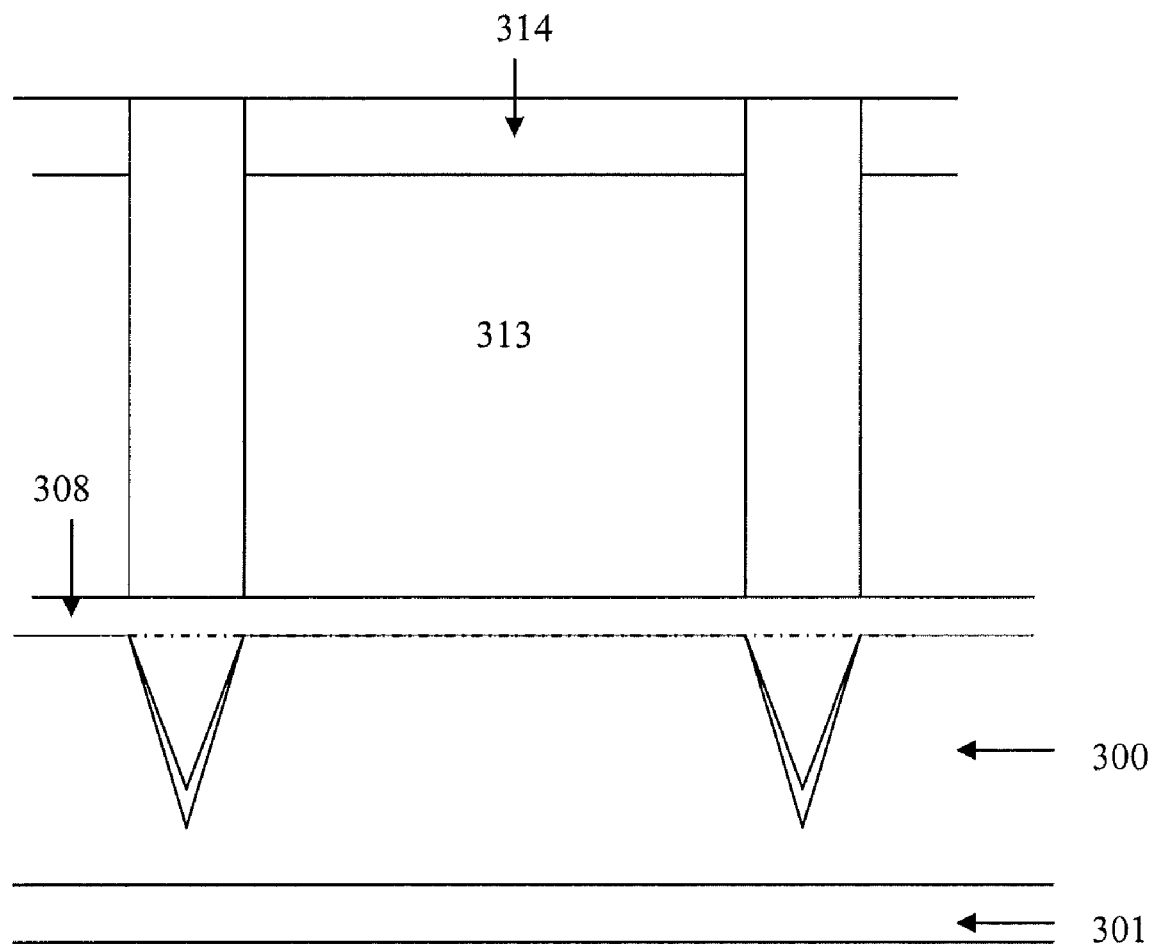
Figure 3J:
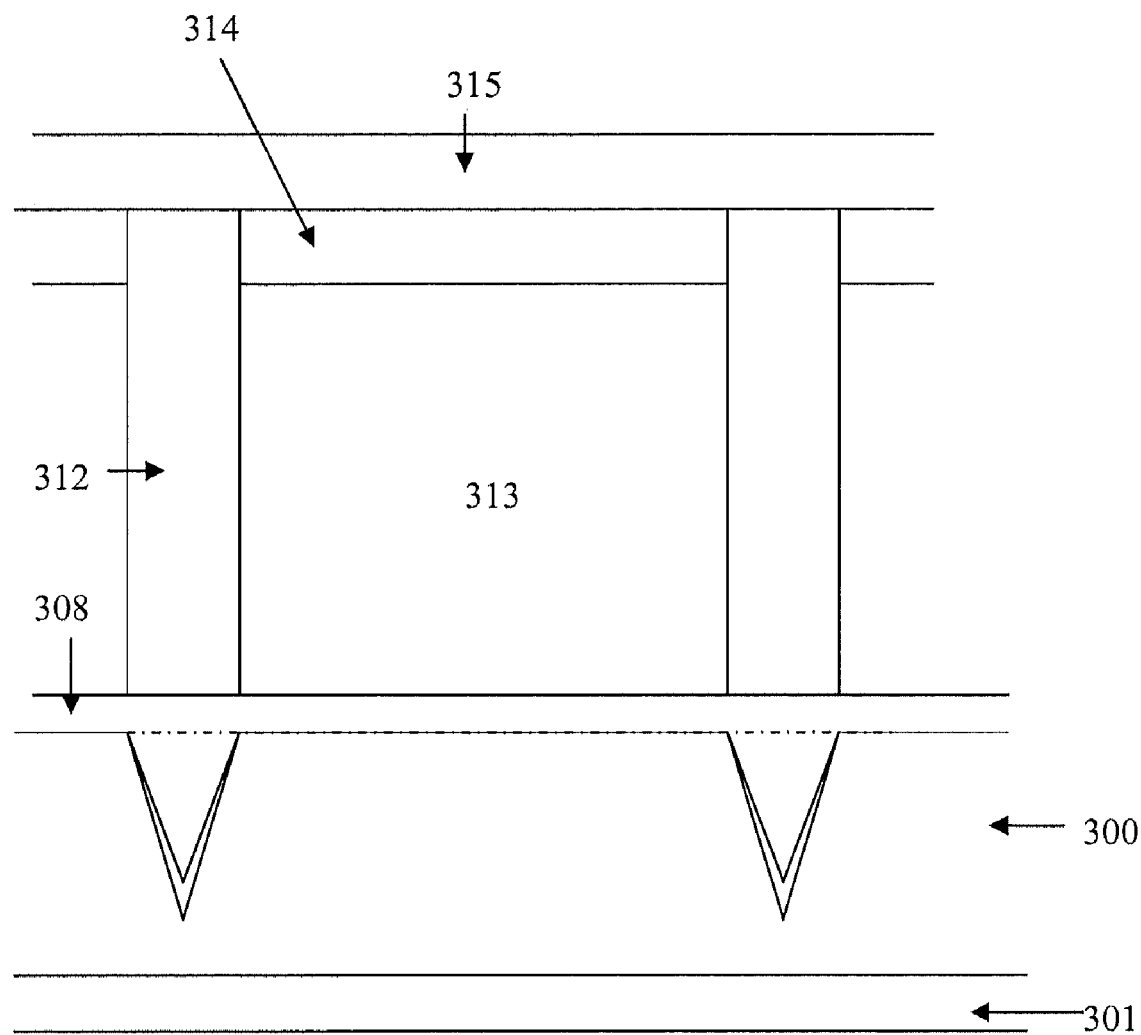
Figure 3K:
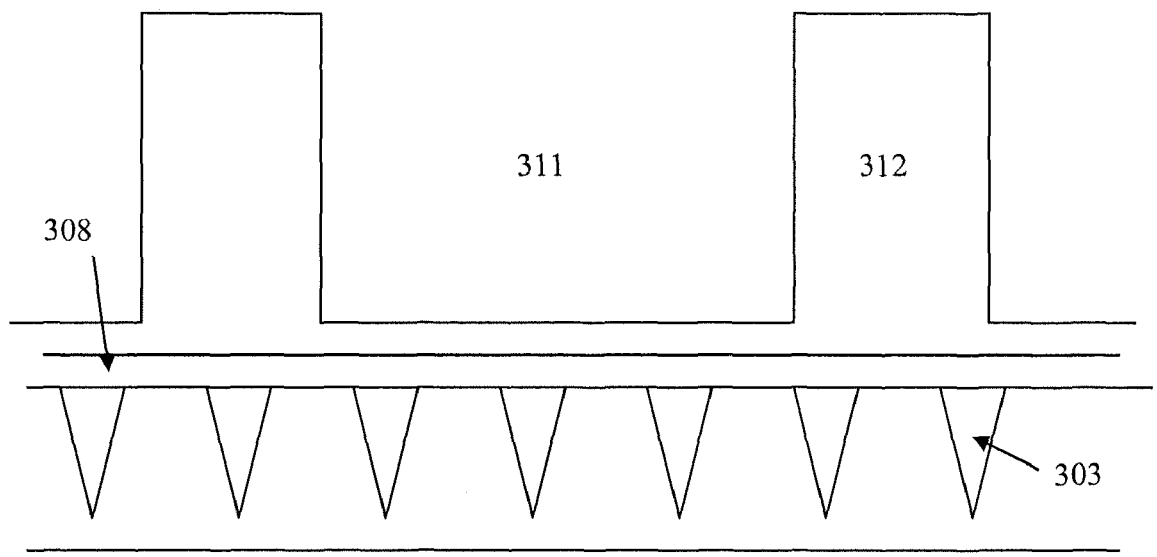
FIG. 3k illustrates an alternative process for manufacturing a display device having the micro-reflectors.
Figure 3M:
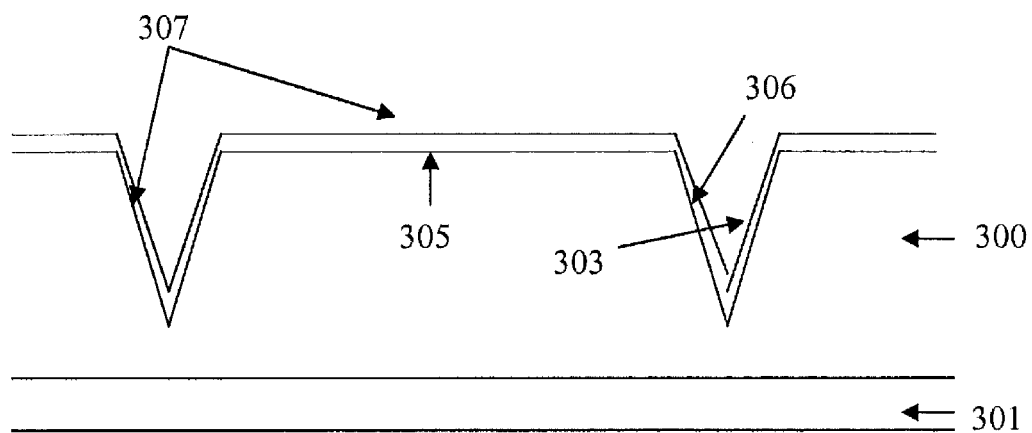
Figure 3M:
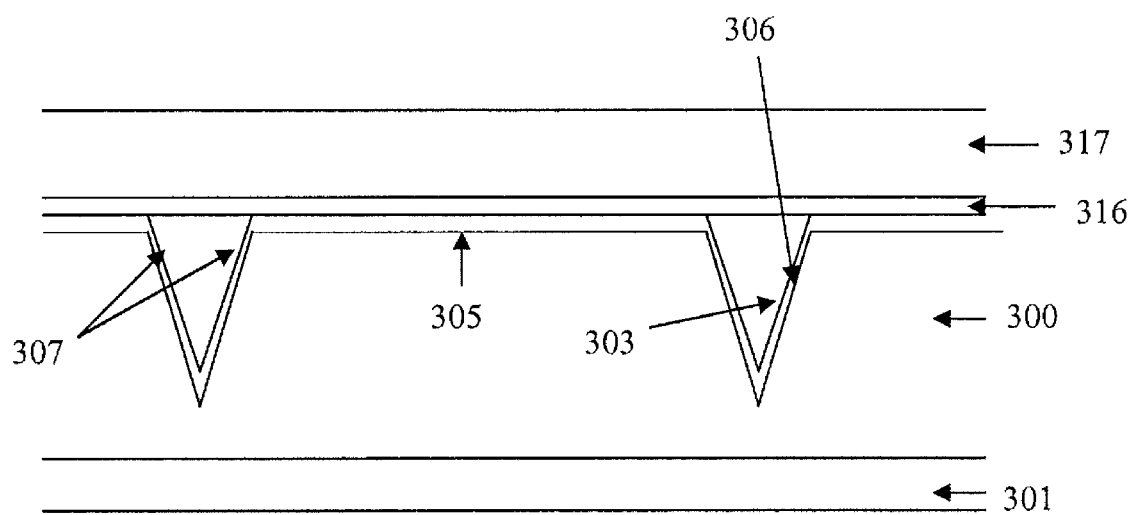

FIGS. 3l and 3m depict an alternative process for depositing the metal layer. In FIG. 3l, a metal layer (307) is deposited over the entire surface first, including both the surface (306) of the micro-structures and the surface (305) between the micro-structures. FIG. 3m shows that the film of micro-structures deposited with a metal layer (307) is laminated with a film (317) coated with an adhesive layer (316). The metal layer (307) on top of the surface (305) may be conveniently peeled off when the micro-structure film is delaminated (separated) from the adhesive layer (316) coated film (317). The thickness of the adhesive layer (316) on the adhesive coated film is preferably in the range of about 1 to about 50 um and more preferably in the range of about 2 to about 10 um.

Manufacture of a Display Device with Micro-Reflectors

FIGS. 3f-3j illustrate how a display device having the micro-reflectors may be formed once the micro-reflector structure has been built.

The inside space (309) of the micro-reflectors may remain empty. However it is preferably filled with a transparent organic polymer (such as epoxy resin, polyacrylate or the like) or a transparent and partially conductive polymer or polymer composition. Details of an example of such a transparent and partially conductive polymer composition are given below.

After the inside space (309) of the micro-reflectors is filled, the surface of the micro-reflectors is planarized. For ease of illustration, the surface (316) is referred to as the "interface" surface in this application. A transparent conductive layer or partially conductive layer (308) is subsequently coated or laminated over the interface surface (316) of the micro-reflectors, as shown in FIG. 3f.

In an alternative embodiment using the partially conductive filler material to fill spaces 309, the transparent conductor layer may be eliminated, and in this case, the interface surface (316) is preferably coated or laminated with the same material filled in spaces 309.

Suitable transparent and conductive materials may include, but are not limited to, ITO, IZO, polymer with embedded carbon nano-tubes, organic conductive polymer and PEDOT.

If a transparent and partially conductive layer is used, such a layer may be formed from a composition as disclosed in U.S. application Ser. No. 11/517,810, the content of which is incorporated herein by reference in its entirety. Briefly, the composition may comprise a polar oligomeric or polymeric material. Such a polar oligomeric or polymeric material may be selected from the group consisting of oligomers or polymers having at least one of the groups such as nitro (—$NO_2$), hydroxyl (—OH), carboxyl (—COO), alkoxy (—OR wherein R is an alkyl group), halo (e.g., fluoro, chloro, bromo or iodo), cyano (—CN), sulfonate (—$SO_3$) or the like. The polar oligomeric or polymeric material has to be compatible with other components in the composition and can be easily processed by simple mixing.

The glass transition temperature of the polar oligomeric or polymeric material is preferably below about 100° C. and more preferably below about 60° C. The transparent and partially conductive layer formed from the composition preferably has an average crosslinking density of below about 1 crosslink point per 80 molecular weight and more preferably below about 1 crosslink point per 120 molecular weight. The concentration of the polar oligomeric or polymeric material may be no less than about 1%, preferably no less than about 3% and most preferably no less than about 10%, by weight in the composition.

With such a composition, the transparent and partially conductive layer will have an intended resistivity of less than about 100 times of that of the electrophoretic dispersion in a display film or the resistivity of the layer may be less than about $10^{12}$ ohm cm.

The composition for the transparent and partially conductive layer may be formulated with a solvent, such as MEK or the like.

The solids are first mixed with the liquid components in the composition for the solid components to completely dissolve. Sonication may be used to facilitate the dissolution of the solid components.

The hardening of the transparent and partially conductive layer composition may be accomplished by mechanisms such as cooling, cross-linking by radiation or heat.

It is also possible to laminate a transparent and partially conductive layer already cured over the interface surface 316.

The transparent and partially conductive layer may have a thickness of up to 15 um, preferably up to 10 um.

For formation of the display cells, a layer of a photosensitive material (310) (e.g., a positively working photoresist) is coated over the transparent conductive or transparent partially conductive layer (308), as shown in FIG. 3g. The thickness of the photosensitive layer would depend on the desired depth of the display cells to be formed, usually in the range of about 2 to about 200 microns.

A light source (e.g., the UV light) radiates from the side of the micro-reflectors as shown and the micro-reflectors serve as a photomask in this photolithography process. The UV light radiates through the opening area between the micro-reflectors onto the photosensitive layer. The exposed areas (between the micro-reflectors) are then removed by an appropriate solvent or developer to form the display cells (311), as shown in FIG. 3h. The solvent or developer is selected from those commonly used for dissolving or reducing the viscosity of a photosensitive material, and could be methylethylketone (MEK), toluene, acetone, isopropanol or the like. The unexposed areas (protected from exposure by the micro-reflectors) become hardened, to form partition walls (312) which surround the display cells.

Figure 8B:
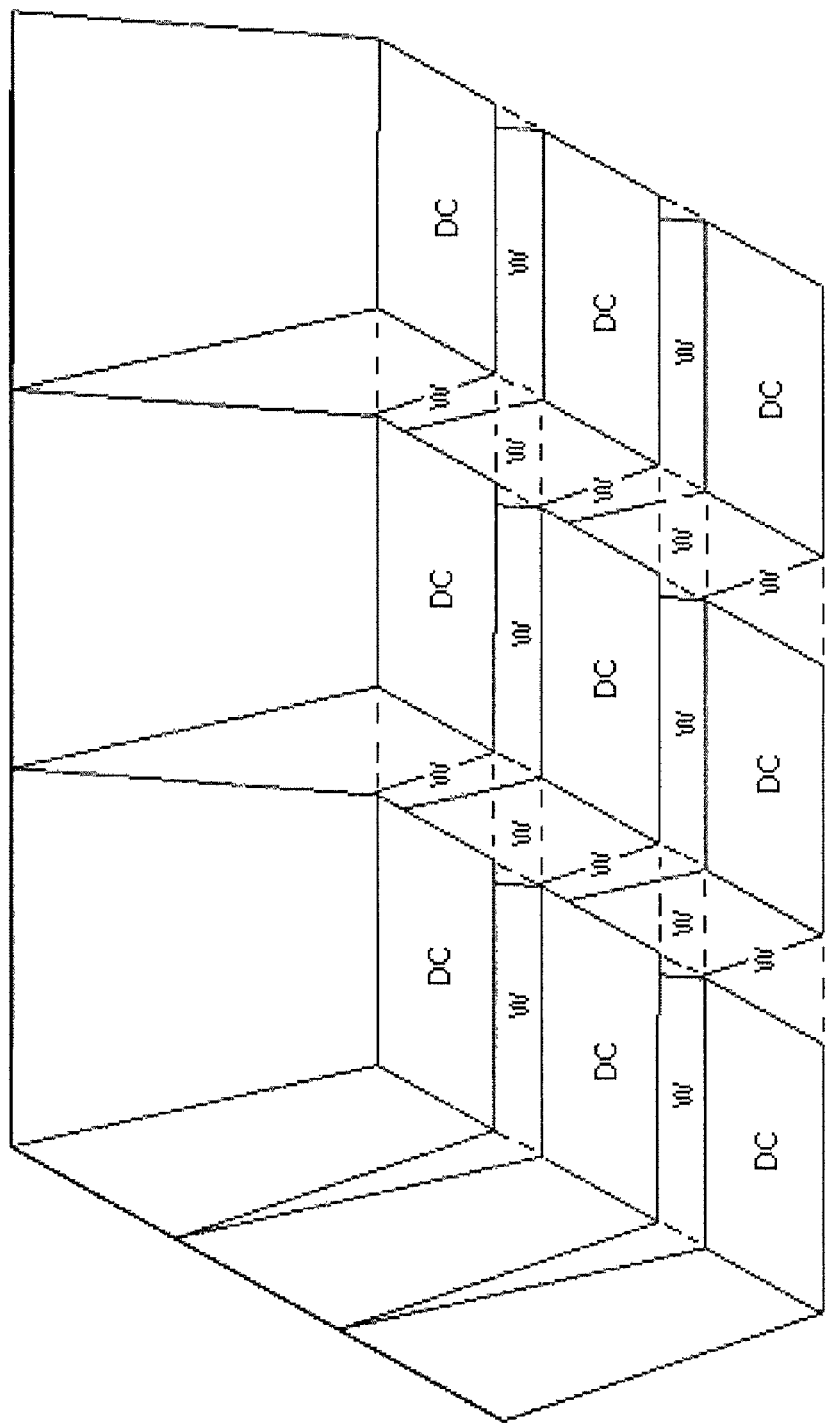
FIG. 8b depicts how the display cells and partition walls are formed in relation to the micro-reflectors.

FIG. 8b is a three-dimensional view of how the display cells with partition walls are aligned with the micro-reflectors. The areas marked "DC" correspond to the areas on which display cells are formed and the areas marked "W" correspond to the areas on which the partition walls are formed.

In FIG. 3i, the display cells thus formed are then filled with a display fluid (313). The filled display cells may be sealed with a polymeric sealing layer (314) by any of the methods as disclosed in U.S. Pat. No. 6,930,818, the content of which is incorporated herein by reference in its entirety.

Depending on the type of the display device, a second electrode layer (315), e.g., a segment electrode layer or a thin film transistor pixel electrode layer, is laminated over the filled and sealed display cells as shown in FIG. 3j, optionally with an adhesive layer (not shown).

Figure 7:
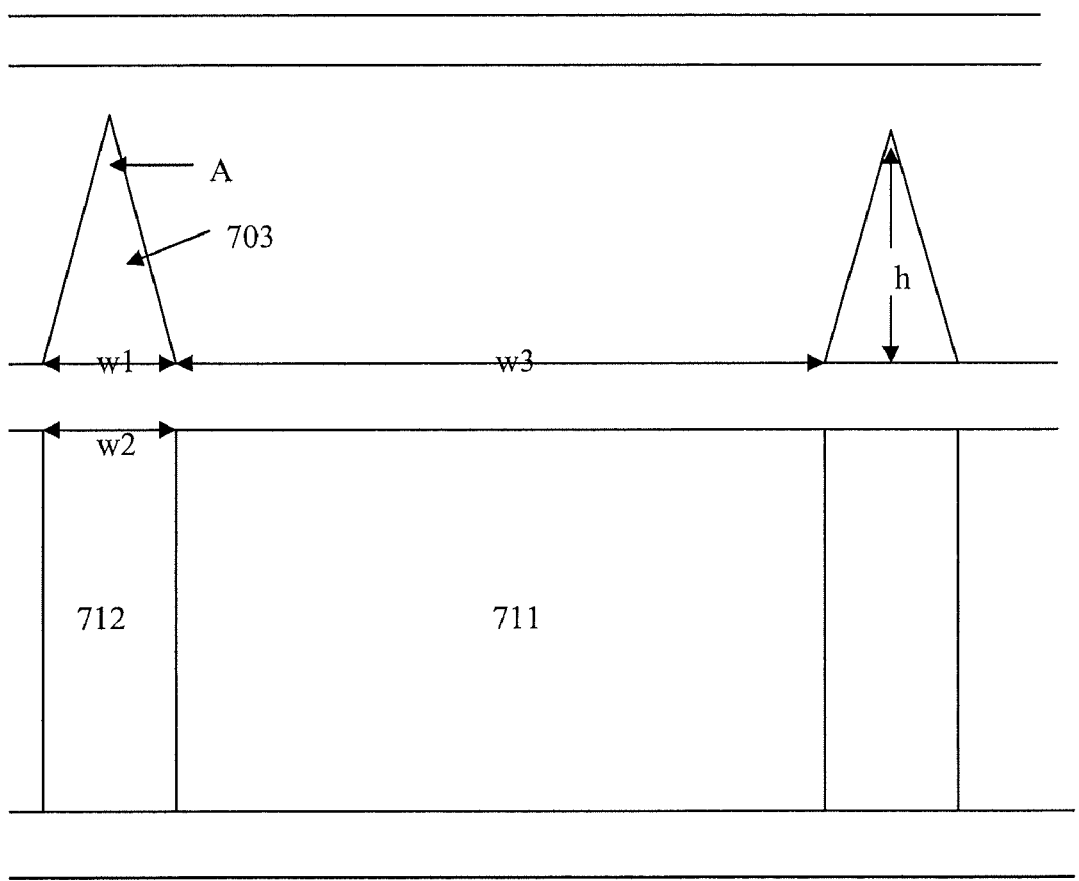
FIG. 7 illustrates the configuration of the micro-reflectors, in a cross-section view.

It is noted that for ease of illustration of the processing step, the display cells are shown in FIGS. 3g, 3h, 3i, 3j and 3k to be on top of the brightness enhancement structure, the display device, when in use, is in fact turned 180°. In other words, the brightness enhancement structure is on the viewing side (as shown in FIG. 7) to allow the micro-reflectors to deflect the light striking the top surface of the display device. For example, the display devices as shown in FIGS. 3j and 3k are indicated to be viewed from the side as marked.

For a passive display device, the layer 308 and 315 would be line-patterned electrode layers.

FIG. 3k illustrates an alternative process for forming the display cells on the transparent conductive or partially conductive layer (308). In this process, the display cells are formed by microembossing, for example, as disclosed in U.S. Pat. No. 6,930,818. As described previously for formation of the micro-reflector structure, an embossable layer is coated on top of layer 308 and a display cell structure is formed by embossing. The display cells formed from this process may have partition walls (312) each of which corresponds to one or more micro-reflectors and are not necessarily aligned with the micro-reflectors. After the display cells (311) are formed, the filling, sealing and lamination steps as described above are carried out to complete the display device. In this case, the micro-reflector structure is used primarily to enhance reflectivity of the display through redirection of light which would otherwise have been lost due to total internal reflection at the top surface, thus increasing brightness. Brightness enhancement through redirection of incident light which would have been incident on the display cell walls is also possible to achieve with this structure, but is only achieved if the micro-reflector has the same pitch as the display cell walls and the structures are aligned (not shown in diagram 3k).

Figure 4:
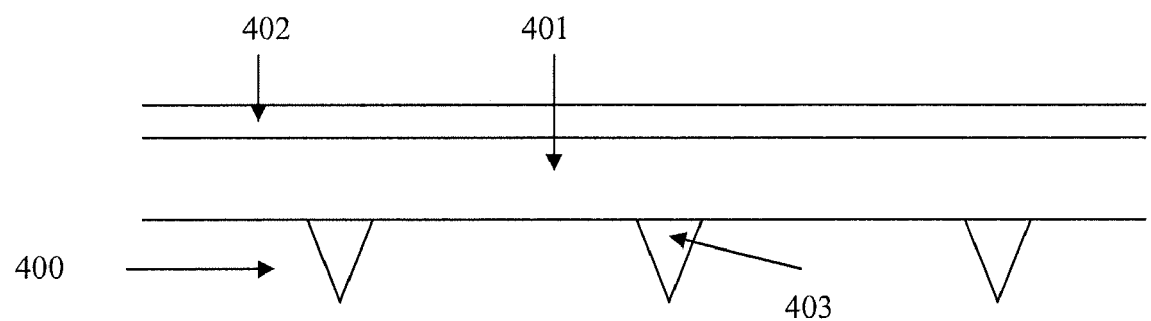
FIG. 4 illustrates an alternative process for manufacturing a brightness enhancement structure comprising micro-reflectors.

FIG. 4 depicts an alternative process for the formation of the micro-reflectors. In this process, a metal mesh (400) comprising the micro-reflectors (403) is independently fabricated using stamping, electroforming, or other metal structure fabrication process. A thin (i.e., about 0.5 mil) substrate (401) is laminated over the metal mesh (400). One side of the substrate (401) is a transparent conductive layer (402). The display cells are subsequently formed on the transparent conductive layer (402). A display device having the micro-reflectors may then be formed following the steps as described above in FIGS. 3g to 3j or FIG. 3k.

Figure 5:
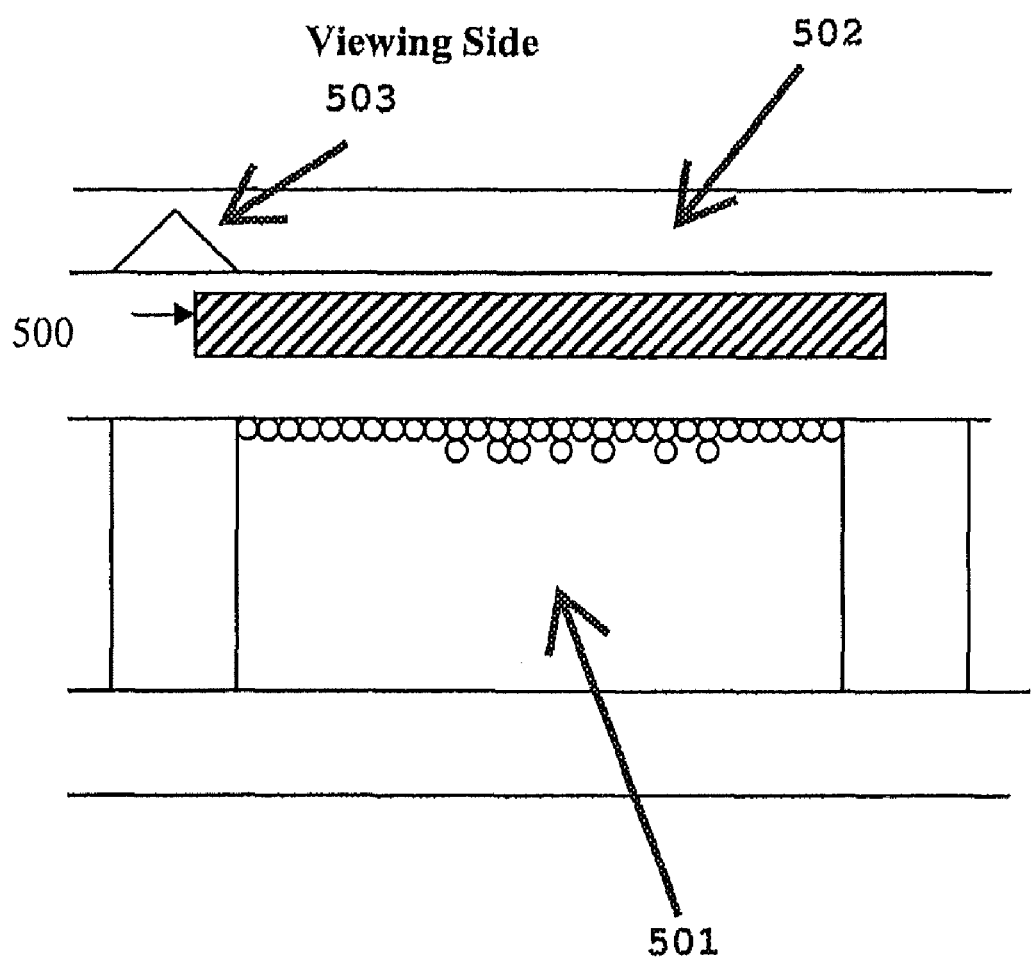
FIG. 5 depicts a display device which comprises a brightness enhancement structure and color filters.

In a display device with a brightness enhancement structure, color filters may also be employed. As shown in FIG. 5, each of the display cells 501 has a color filter (500). The color filters may be underneath the brightness enhancement structure 502, as shown. The presence of the color filters will cause a significant loss of light energy. The presence of the brightness enhancement structure helps to compensate the effect of such loss and provides improved on-axis brightness.

In addition, there are dead spots between color filters of different colors. When the brightness enhancement structure is used, the micro-reflectors 503 may be aligned with the dead spots and the dead spots could be hidden underneath the micro-reflectors, thus effectively increasing the aperture ratio of the display device.

Alternatively, the color filters may be placed on top of the brightness enhancement structure.

The brightness enhancement structure comprising micro-reflectors may also be applied to a color display device with a dual switching mode. U.S. Pat. No. 7,046,228 discloses an electrophoretic display device having a dual switching mode which allows the charged pigment particles in a display cell to move in either the vertical (up/down) direction or the planar (left/right) direction. The content of U.S. Pat. No. 7,046,228 is incorporated in this application by reference in its entirety.

Figure 6A:
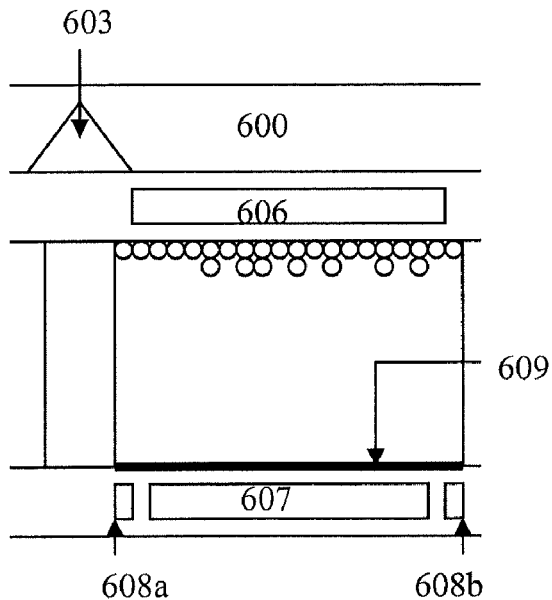
FIGS. 6a-6c depict a color display device which has a dual switching mode and a brightness enhancement structure comprising micro-reflectors on the viewing surface of the display device.
Figure 6B:
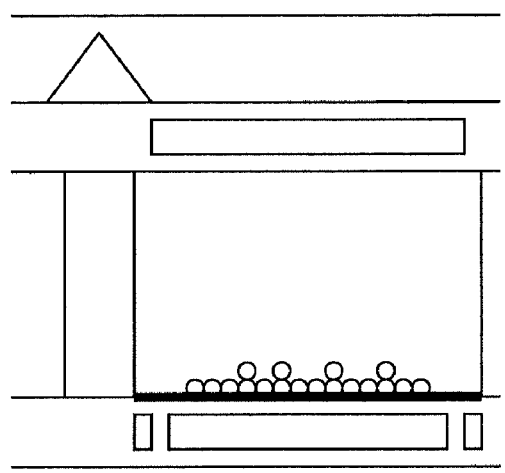
Figure 6C:
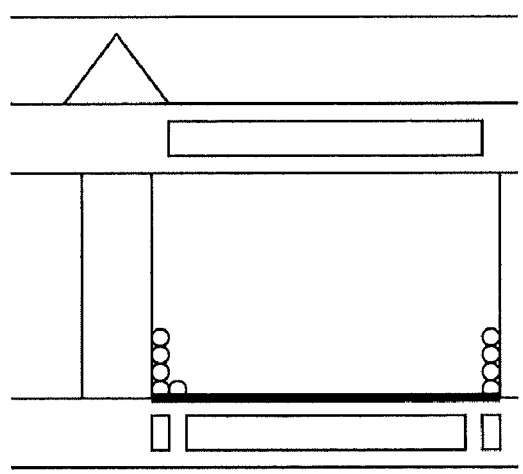

The dual mode display device with a brightness enhancement structure is illustrated in FIGS. 6a-6c. In such a display device, each of the display cells is sandwiched between two layers, one of which comprises a common electrode whereas the other layer comprises a center electrode and at least one in-plane electrode. For illustration purpose, it is assumed that the display cells are filled with a clear, but colored dielectric solvent with charged white pigment particles dispersed therein and the background color of the display cells is black.

While the charged pigment particles are driven to be at or near the transparent common electrode (606), the color of the particles is seen, from the top viewing side (see FIG. 6a). While the charged pigment particles are driven to be at or near the center electrode (607) located at approximately the center of the bottom of each display cell, the color of the solvent is seen (see FIG. 6b) and while the charged pigment particles are driven to be at or near the in-plane electrode(s) (608a and 608b), the color of the display cell background (609) is seen (see FIG. 6c), from the viewing side. Accordingly, each of the display cells is capable of displaying three color states, i.e., the color of the charged pigment particles, the color of the dielectric solvent or the background color of the display cell. The dual mode display device may be driven by an active matrix system or by a passive matrix system.

The brightness enhancement structure (600) comprising micro-reflectors (603) may be prepared by any one of the methods illustrated above.

The Dimensions of the Micro-Reflectors

As stated earlier, because of the presence of a substrate layer which has a higher refractive index than the air surrounding the display panel, some of the scattered light from the display may be reflected back to the display cell surface.

In an example without the micro-reflector structure, assuming the refractive index of the substrate layer being about 1.5, the critical angle for reflection calculated based on the Snell's law would be approximately 42°. The critical angle of 42° is calculated from $\sin^{-1}(n2/n1)$ and in this example, "n2" is 1 which is the index of refraction of air and "n1" is 1.5 which is the index of refraction of the material for the transparent top surface. Any light striking the top surface of the display panel at an angle higher than the critical angle 42° would be reflected. In other words, any scattered light having an angle greater than 42°, will undergo a total internal reflection when reaching the boundary between the substrate layer and the air, and thus be reflected back to the display.

The micro-reflectors are configured to intercept the scattered light rays (as shown in FIG. 2b) which could potentially be lost to total internal reflection and redirect them toward the viewer because they strike the top surface at an angle less than the critical angle.

In the case of a microcup-based display with aligned micro-reflectors and cell walls, as shown in 3j, the base of the micro-reflectors is chosen to be the same width or wider than the partition walls (and sit on top of the partition walls), so that light striking the display cell structure which would normally be lost to the wall region is redirected by the micro-reflectors onto the active display surface.

As an example, the micro-reflectors (703), as shown in FIG. 7, have a base width ("w1") which is substantially equal to the width ("w2") of the partition walls (712), a height ("h") and a top angle (A). In one example, if the width ("w3") of the cell (711) between the micro-reflectors is about 160 microns and the width ("w2") of the cell walls is about 40 microns, then the optimal height ("h") of the micro-reflectors to intercept all the light would be about 133 microns. The height ("h") of the micro-reflectors is selected to intercept most or all of the light reflected from the display at an angle greater than 42°.

An alternative design would have a greater top angle ("A") of the micro-reflectors so that the light scattered from the center of the cells is redirected more towards the viewer, giving enhanced brightness.

Other configurations of the micro-reflectors may also be chosen, based on criteria such as the desirable cell size, the minimum or maximum wall dimensions and other factors. The height will be selected as described above, but it is in general preferred that the height (h) of the micro-reflectors will fall in the range of 0.3 to 2 times of the width of the display cells (w3).

In the case of micro-reflectors which are not aligned with the cell walls as shown in FIG. 3k, the width of the base of each micro-reflector may be much less than the width of the cell wells, but the relationship between the height of the micro-reflector and the space between the micro-reflectors is the same as described above with the same limitation on the top angle of the micro-reflector.

The present application discloses a display device, which comprises: (a) an array of display cells separated by partition walls; and (b) an array of micro-reflectors on top of the array of the display cells. In one embodiment, the height of the micro-reflectors is about 0.3 to 2 times the width of the display cells. In one embodiment, the micro-reflectors are aligned with the partition walls and sit on top of the partition walls. In another embodiment, the micro-reflectors are not aligned with the partition walls. In one embodiment, one partition wall corresponds to one or more of the micro-reflectors. In one embodiment, the display cells are sandwiched between two electrode layers. In one embodiment, one of the electrode layers is a segment electrode layer. In one embodiment, one of the electrode layers is a thin film transistor electrode layer.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A process for manufacturing a brightness enhancement structure comprising micro-reflectors, which process comprises:
   a) forming an array of micro-structures by embossing;
   b) coating the surface between openings of the micro-structures with a strippable masking layer;
   c) depositing a metal layer over the surface between the openings of the micro-structures and the surface of the micro-structures; and
   d) removing the strippable masking layer and the metal layer deposited thereon, leaving the metal layer only on the surface of the micro-structures.

2. A process for manufacturing a brightness enhancement structure comprising micro-reflectors, which process comprises:
   a) forming an array of micro-structures by embossing;
   b) depositing a metal layer on the surface between openings of the micro-structures and the surface of the micro-structures;
   c) laminating a film coated with an adhesive layer over the surface between the openings of the micro-structures; and d) delaminating the film to remove the metal layer on the surface between the openings of the micro-structures, leaving the metal layer only on the surface of the micro-structures.

3. A process for manufacturing a display device comprising micro-reflectors, which process comprises:
  a) forming an array of micro-reflectors comprising a metal surface;
  b) coating the interface surface of the micro-reflectors with a transparent conductive or partially conductive layer; and
  c) forming display cells on the transparent conductive or partially conductive layer by photolithography, with the micro-reflectors as a photomask.

4. The process of claim 3, wherein step (c) is performed with a positively working photoresist.

5. The process of claim 3, wherein said transparent conductive layer is formed from ITO, IZO, a organic polymer, carbon nano-tube, or PEDOT.

6. The process of claim 3, wherein the transparent partially conductive layer is formed from a polar oligomeric or polymeric material having at least one group selected from the group consisting of nitro, hydroxyl, carboxyl, alkoxy, halo, cyano, and sulfonate.

7. The process of claim 3, wherein the display cells are formed by steps comprising:
  a) overcoating the transparent conductive or partially conductive layer with a layer of a photosensitive material;
  b) exposing the layer of the photosensitive material to a radiation source through the array of micro-reflectors which acts as a photomask; and
  c) removing the exposed photosensitive material.

8. The process of claim 3, further comprising filling the display cells with a display fluid and sealing the filled display cells with a polymeric sealing layer.

9. The process of claim 3, wherein said micro-reflectors are formed by embossing, followed by depositing a metal layer over the surface of said micro-reflectors.

10. The process of claim 3, wherein said micro-reflectors are built in a metal mesh.

11. A process for manufacturing a display device comprising micro-reflectors, which process comprises:
  a) forming an array of micro-reflectors comprising a metal surface;
  b) coating the interface surface of the micro-reflectors with a transparent conductive or partially conductive layer; and
  c) laminating the array of micro-reflectors to a separately formed display cell structure.

12. The process of claim 11, wherein said transparent conductive layer is formed from ITO, IZO, a organic polymer, carbon nano-tube, or PEDOT.

13. The process of claim 11, wherein the transparent partially conductive layer is formed from a polar oligomeric or polymeric material having at least one group selected from the group consisting of nitro, hydroxyl, carboxyl, alkoxy, halo, cyano, and sulfonate.

14. A process for manufacturing a display device comprising micro-reflectors, which process comprises:
  a) forming an array of micro-reflectors comprising a metal surface;
  b) coating the interface surface of the micro-reflectors with a transparent conductive or partially conductive layer; and
  c) forming display cells on the transparent conductive or partially conductive layer by microembossing.

15. The process of claim 14, wherein said transparent conductive layer is formed from ITO, IZO, a organic polymer, carbon nano-tube, or PEDOT.

16. The process of claim 14, wherein the transparent partially conductive layer is formed from a polar oligomeric or polymeric material having at least one group selected from the group consisting of nitro, hydroxyl, carboxyl, alkoxy, halo, cyano, and sulfonate.

17. The process of claim 14, further comprising filling the display cells with a display fluid and sealing the filled display cells with a polymeric sealing layer.

18. A display device comprising a plurality of display cells filled with a display fluid, color filters and a brightness enhancement structure comprising micro-reflectors on a viewing surface of the display device.

19. A color display device comprising:
  (a) a plurality of display cells each of said display cells is sandwiched between a first layer comprising a common electrode and a second layer comprising a center electrode and at least one in-plane electrode; and
  (b) a brightness enhancement structure comprising micro-reflectors on a viewing surface of the display device.

20. The color display device of claim 19, wherein the display cell is filled with an electrophoretic fluid comprising charged pigment particles dispersed in a dielectric solvent or solvent mixture.

21. The color display device of claim 20, wherein each display cell is capable of displaying color of the charged pigment particles, color of the dielectric solvent or solvent mixture or a background color.

* * * * *

UNITED STATES PATENT AND TRADEMARK OFFICE
CERTIFICATE OF CORRECTION

PATENT NO. : 7,830,592 B1
APPLICATION NO. : 12/323300
DATED : November 9, 2010
INVENTOR(S) : Robert A. Sprague et al.

It is certified that error appears in the above-identified patent and that said Letters Patent is hereby corrected as shown below:

Column 11, Claim 3, at line 9, after "coating", change "the" to --an--.

Column 11, Claim 5, at line 18, before "organic polymer", change "a" to --an--.

Column 11, Claim 6, at lines 20-21, change "transparent partially conductive layer" to --interface surface is coated with a transparent partially conductive layer which--.

Column 11, Claim 7, at lines 25-26, change "display cells are formed by steps comprising" to --step c) comprises--; at line 3, change "a)" to --d)--; at line 5, change "b)" to --e)--; at line 8, change "c)" to --f)--.

Column 11, Claim 11, at line 45, after "coating", change "the" to --an--.

Column 12, Claim 12, at lines 1-2, change "transparent conductive layer" to --interface surface is coated with a transparent conductive layer which--.

Column 12, Claim 13, at lines 4-5, change "transparent partially conductive layer" to --interface surface is coated with a transparent partially conductive layer which--.

Column 12, Claim 14, at line 13, after "coating", change "the" to --an--.

Column 12, Claim 15, at lines 18-19, change "transparent conductive layer" to --interface surface is coated with a transparent conductive layer which--.

Column 12, Claim 16, at lines 21-22, change "transparent partially conductive layer" to --interface surface is coated with a transparent partially conductive layer which--.

Signed and Sealed this
Fourth Day of October, 2011

David J. Kappos
*Director of the United States Patent and Trademark Office*

CERTIFICATE OF CORRECTION (continued)
U.S. Pat. No. 7,830,592 B1

Column 12, Claim 18, lines 29-31, change "A display device comprising a plurality of display cells filled with a display fluid, color filters and a brightness enhancement structure comprising micro-reflectors on a viewing surface of the display device" to
--A color display device comprising:
    a plurality of display cells;
    color filters; and
    a brightness enhancement structure comprising micro-reflectors on a viewing surface of the display device; wherein each of the color filters corresponds to each of the display cells, and said color filters are either on top of the brightness enhancement structure or underneath the brightness enhancement structure--.

Column 12, Claim 19, line 33, delete "color"; line 34, after "cells", change "is" to --being--; lines 36-37, after "center electrode", insert --located at approximately the center of the bottom of the display cell--.

Column 12, Claim 20, line 40, delete "color".

Column 12, Claim 21, line 44, delete "color"; line 47, after "mixture", insert --,--.